April 9, 1968             JAMES E. WEBB          3,376,730
ADMINISTRATOR OF THE NATIONAL AERONAUTICS
AND SPACE ADMINISTRATION
FRICTION MEASURING APPARATUS
Filed June 29, 1966
FIG. 1
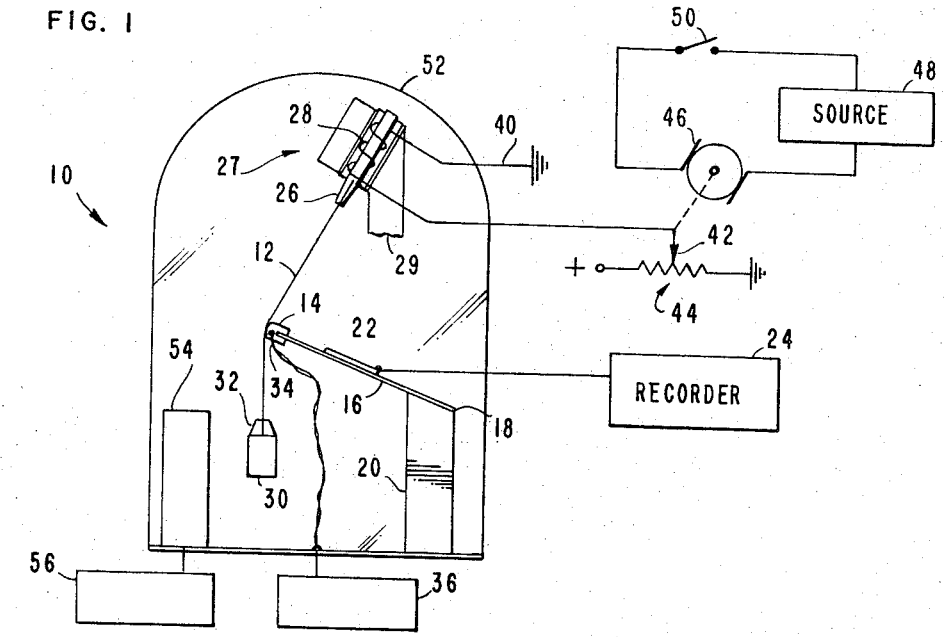
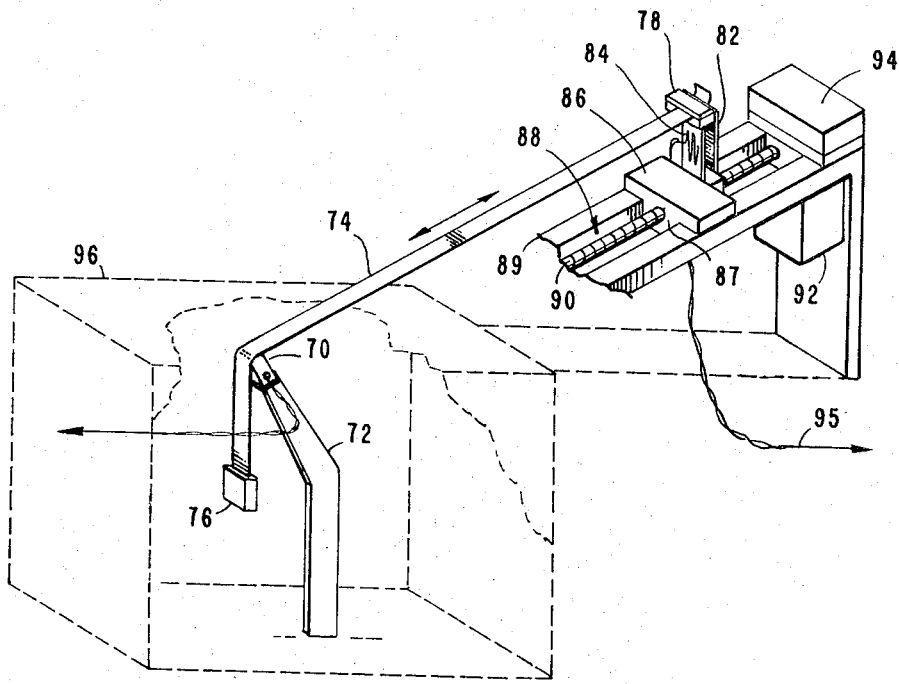
FIG. 2
INVENTORS
WARREN G. CLEMENT
PLEASANT T. COLE
BY
ATTORNEYS

United States Patent Office 3,376,730
Patented Apr. 9, 1968

3,376,730
FRICTION MEASURING APPARATUS
James E. Webb, Administrator of the National Aeronautics and Space Administration, with respect to an invention of Warren G. Clement, Pasadena, Calif., and Pleasant T. Cole, Oxon Hill, Md.
Filed June 29, 1966, Ser. No. 562,444
5 Claims. (Cl. 73—9)

ABSTRACT OF THE DISCLOSURE

An apparatus for measuring the static friction between the surfaces of a magnetic tape and a magnetic head. The apparatus includes means mounting a magnetic head in a substantially fixed position. Power means are provided for pulling the tape across the head with the tape surface contacting the head surface. A cantilevered leaf spring is provided, whose free end either supports the magnetic head or is secured to one end of the magnetic tape. As the tape is pulled across the head, the leaf spring will flex by an amount related to the friction between the tape and head. The flexure in the leaf spring is determined by a strain gauge.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to apparatus suitable for measuring the friction force, both static and kinetic, between various surfaces.

Significant difficulties have arisen in the use of magnetic tape equipment under extreme environmental conditions such as are encountered in spacecraft applications. These difficulties arise as a consequence of the static friction or stiction which develops between the tape surface and the head for example. More particularly, it has been found that oftentimes when the equipment remains in a dormant condition at an elevated temperature, the tape tends to adhere to the heads thus jeopardizing the equipment's start-up capability.

In order to eliminate, or at least minimize, this problem of developing static friction, it is essential that means be available for measuring such static friction forces under laboratory conditions. Accordingly, it is an object of the present invention to provide apparatus for measuring static friction forces between such surfaces as magnetic tape and head surfaces.

Briefly, in accordance with a first embodiment of the invention a test head is mounted on a cantilever spring to which strain gauges are attached for measuring flexure. The tape to be tested is draped over the head, being secured at its upper end to a solenoid armature and at its lower end to a weight. In this way, constant tape tension is maintained. Operation of the solenoid pulls the tape over the head so as to flex the cantilevered spring by an amount related to the static friction forces.

In accordance with a second embodiment of the invention, the upper end of the tape is clamped to a cantilever spring carrying a strain gauge. The tape is drawn very slowly over the fixedly mounted head while the output of the strain gauge, which is related to the static friction, is monitored. If the tape is moved sufficiently slowly over the head, a continuous measurement of static friction will be provided.

The novel features that are considered characteristic of this invention are set forth with particularity in the appended claims. The invention will best be understood from the following description when read in connection with the accompanying drawings, in which:

FIGURE 1 is a block schematic diagram illustrating a first embodiment of the invention; and FIGURE 2 is a block schematic diagram illustrating a second embodiment of the invention.

Attention is now called to FIGURE 1 which illustrates an apparatus 10 capable of measuring the static friction between the surfaces of two members. More particularly, the apparatus 10 of FIGURE 1 is capable of measuring the static friction between the surface of a flexible elongated member 12, such as a piece of magnetic recording tape and a magnetic head 14. The head 14 is supported on the free end of a cantilevered flexure member or leaf spring 16. A second end of the flexure member 16 is secured to the upper surface 18 of a block 20. A conventional strain gauge 22 is mounted on the flexure member 16 and is responsive to any strain occurring therein. The output of the strain gauge 22 is preferably connected to a recording device 24, such as a chart recorder.

A first or upper end of the tape 12 is clamped to a movable member 26 which can comprise the armature of a solenoid 27. The solenoid 27 includes a winding 28 physically disposed adjacent the armature 26 such that when the winding 28 is properly energized, the armature 26 is drawn upwardly. The solenoid 27 is supported by bracket 29. A weight 30 is attached to the second or lower end of the tape 12 by a hook 32. Utilization of the weight 30 establishes a substantially constant tension within the tape 12 and causes the tape surface to engage the surface of the head 14.

A thermocouple 34 is disposed adjacent the head 14 for determining the temperatures to which the surfaces of the members 12 and 14 are subjected. The thermocouple 34 is preferably connected to a readout meter 36.

The winding 28 is connected to a variable voltage source. More particularly, one terminal of the winding 28 is connected to a ground potential terminal 40 while the second terminal thereof is connected to a movable arm 42 of a potentiometer 44. The arm 42 can be driven by a motor 46 which can be energized by source 48 through a switch 50.

In order to enable desired environmental conditions to be established at the surfaces of the members 12 and 14, a bell jar 52 is provided which envelops at least the portions of the surfaces 12 and 14 which are engaged with one another. Any suitable apparatus 54 is disposed within the jar 52 for establishing and controlling the environmental conditions within the jar. For example, it may be desired to control the temperature, humidity, pressure, and other factors. The apparatus 54 can be controlled by a control device 56 disposed outside the jar 52.

In order to utilize the apparatus of FIGURE 1 to measure the static friction between the surface of the tape member 12 and the head 14, the head is initially installed at the free end of the flexure member 16. The head is then carefully cleaned to remove any contaminants. The length of test tape 12 is then clamped in place between the weight 30 and armature 26. The bell jar is then placed over the assembly and the desired environmental conditions are established within the bell jar. For example, it may be desired to create an oxygen-free environment and thus the bell jar can be purged and backfilled with dry nitrogen for example. A slight negative differential pressure is preferably maintained within the bell jar in order to keep it sealed. Friction between the head 14 and tape member 12 is then measured by energizing the motor 46 to ultimately move the armature 26. As a consequence of the static friction between the tape 12 and head 14, the flexure member 16 will flex causing the strain gauge 22 to provide a signal proportionate to the flexure and thus related to the static friction force to the strip recorder 24.

Thereafter, desired environmental test conditions, e.g. high heat, can be established within the jar 52 and maintained for a desired period. At the end of this period, the environmental conditions can be returned to normal and the motor 46 can then be energized to again determine the static friction between the tape member 12 and head 14. The difference in the amount of deflection of the flexure member 16 will indicate the effect that the environmental test conditions had on the static friction characteristics between the surfaces of the tape member 12 and head 14.

Attention is now called to FIGURE 2 which illustrates a second embodiment of the present invention. The embodiment of FIGURE 2 is useful for measuring both static and kinetic friction. Static friction is normally determined by the measure of impending motion when all conditions of equilibrium of limiting friction and impending motion are satisfied. Since impending motion involves an applied force without motion but of sufficient magnitude to cause motion, the force measured immediately when motion ensues is assumed to be the value of impending motion. Known prior art static friction measuring devices either directly or indirectly measure the force at the moment motion occurs. As a consequence, all known prior art static friction measuring devices can be considered as one shot devices since, once uncontrolled motion ensues, the conditions of equilibrium are no longer satisfied. The embodiment of the invention illustrated in FIGURE 2 achieves continuous measurement of static friction without resetting, readjustment, or handling of the test samples. The embodiment of FIGURE 2 is based on published experiments which show that kinetic friction increases as velocity decreases and passes without discontinuity into static friction. Thus, a continuous measurement of static friction can be achieved by employing a very low relative velocity between the tape and head.

More particularly, whereas the head 14 in FIGURE 1 was supported on the free end of a cantilevered flexure member 16, the head 70 in the embodiment of FIGURE 2 is supported on the free end of a fixed arm 72. A tape member 74 is draped over the head 70 and supports a weight 76 which holds the tape 74 against the head 70 and establishes a substantially constant tension in the tape. The second end of the tape 74 is secured in a clamp 78 mounted on a flexure member 82. A strain gauge 84 is mounted on the flexure member 82.

The flexure member 82 is carried by a block 86 having a key portion 87 mounted for movement along a keyway 88 in an inclined ramp 89. The key portion 87 is provided with a threaded aperture which threadedly receives a lead screw 90. The lead screw 90 is coupled to a motor 92 through a gear reduction means 94. When the motor 92 is energized, the lead screw 90 is rotated at a very slow speed as a consequence of the gear reduction means 94. Thus the block 86 is very slowly moved along the lead screw 90. As a consequence, a force is of course transferred to the tape 74 tending to pull it across the head 70.

The friction between the surface of the tape 74 and head 70 will of course flex the flexure member 82 by an amount proportional to that friction. The strain gauge 84 is of course responsive to the amount that the member 82 flexes and provides an output signal proportional thereto through conductors 94.

Utilizing the apparatus of FIGURE 2, test results indicate that a relative velocity between the tape 74 and head 70 on the order of 0.0001 inch per second is adequate to achieve sustained static friction measurement. When the block 86 is moved along the lead screw at this rate, the output of the strain gauge 84 will rise to a maximum value, thereby indicating that the kinetic and static friction have assumed the same value.

As with the embodiment of FIGURE 1, it is preferable that the head 70 and tape 72 be contained within a housing 96 in which desired environmental conditions can be established.

From the foregoing, it should be appreciated that at least two embodiments of an apparatus suitable for measuring static friction between the surfaces of two members adapted to move relative to one another, have been disclosed herein. Although primary attention has been paid herein to the measurement of static friction between a piece of magnetic tape and a magnetic head, it should be appreciated that the apparatus is equally useful for measuring static friction between other members. For example, it may be desired to measure the static friction of a film strip and guide member when subjected to certain extreme environmental conditions. Also for example, it may be desirable to determine the static friction coefficient between two adjacent layers of magnetic tape. In order to do this, a piece of magnetic tape can be looped around the head 70 in FIGURE 2 so that the tape 74 bears against a piece of magnetic tape.

Inasmuch as it is recognized that these and other modifications falling within the spirit of the invention will occur to those skilled in the art, it is not intended that the scope of the invention be limited to the specific embodiments illustrated but rather should be determined by the scope of the appended claims.

What is claimed is:

1. A friction measuring apparatus including:
   a substantially fixedly mounted magnetic head member having a first surface;
   an elongated member comprising a piece of flexible magnetic tape having a first surface;
   mounting means for holding one end of said elongated member and for engaging said elongated member first surface with said head member first surface, said mounting means including power means for applying a force to said elongated member tending to draw the first surface thereof across said head member first surface;
   an elongated flexible leaf spring having first and second ends;
   means fixedly anchoring said leaf spring first end;
   means coupling said leaf spring second end to one of said members; and
   strain gauge means for determining the flexure in said leaf spring.

2. The combination of claim 1 wherein said elongated member is disposed substantially vertically and has a lower end and an upper end;
   means weighting said lower end; and
   means coupling said power means to said upper end.

3. The combination of claim 1 wherein said power means includes a movable block; and
   means for moving said block relative to said magnetic head member.

4. The combination of claim 3 including means mounting said leaf spring on said block; and
   means securing one end of said elongated member to said leaf spring.

5. The combination of claim 1 including means for controlling environmental conditions at said first surfaces of said head and elongated members.

References Cited

UNITED STATES PATENTS

| 1,668,593 | 5/1928 | Jones | 73—9 |
| 2,397,227 | 3/1946 | Wilhoyte | 73—7 |
| 2,471,423 | 5/1949 | Gisser | 73—9 |
| 2,531,906 | 11/1950 | Christian | 73—9 |
| 2,718,779 | 9/1955 | McLean | 73—7 |
| 2,910,863 | 11/1959 | Hornbostel et al. | 73—7 XR |
| 2,990,713 | 7/1961 | Heffelfinger et al. | 73—9 |
| 3,178,928 | 4/1965 | Howe | 73—9 |

LOUIS R. PRINCE, *Primary Examiner.*

DAVID SCHONBERG, *Examiner.*

JEFFREY NOLTON, *Assistant Examiner.*